(12) United States Patent
Dreezen et al.

(10) Patent No.: US 9,770,886 B2
(45) Date of Patent: Sep. 26, 2017

(54) ELECTRICALLY CONDUCTIVE ADHESIVES COMPRISING SILVER-COATED PARTICLES

(71) Applicant: HENKEL AG & CO. KGAA, Duesseldorf (DE)

(72) Inventors: Gunther Dreezen, Balen-Olmen (BE); Liesbeth Theunissen, Wilsele (BE); Anja Henckens, Zonhoven (BE)

(73) Assignee: HENKEL AG & CO. KGAA, Duesseldorf (DE)

( * ) Notice: Subject to any disclaimer, the term of this patent is extended or adjusted under 35 U.S.C. 154(b) by 517 days.

(21) Appl. No.: 14/190,762

(22) Filed: Feb. 26, 2014

(65) Prior Publication Data

US 2014/0178671 A1   Jun. 26, 2014

Related U.S. Application Data

(63) Continuation of application No. PCT/EP2012/068443, filed on Sep. 19, 2012.

(30) Foreign Application Priority Data

Sep. 20, 2011  (GB) .................................. 1116240.1

(51) Int. Cl.
| | |
|---|---|
| *B32B 7/12* | (2006.01) |
| *H01R 4/04* | (2006.01) |
| *C09J 9/02* | (2006.01) |
| *C09J 163/00* | (2006.01) |
| *C08G 59/18* | (2006.01) |
| *C08K 3/08* | (2006.01) |

(52) U.S. Cl.
CPC .............. *B32B 7/12* (2013.01); *C08G 59/184* (2013.01); *C09J 9/02* (2013.01); *C09J 163/00* (2013.01); *H01R 4/04* (2013.01); *C08K 3/08* (2013.01); *Y10T 428/25* (2015.01)

(58) Field of Classification Search
CPC ...... B32B 7/12; H01R 4/04; C09J 9/02; C09J 163/00
See application file for complete search history.

(56) References Cited

U.S. PATENT DOCUMENTS 4,066,625 A   1/1978 Bolger

FOREIGN PATENT DOCUMENTS

| EP | 0569044 A1 | 11/1993 | |
|---|---|---|---|
| JP | 03166284 A | 7/1991 | |
| JP | 2004-047418 A | 2/2004 | |
| WO | 2009005135 A1 | 1/2009 | |
| WO | 2011003948 A2 | 1/2011 | |
| WO | WO 2011/003948 * | 1/2011 | ................ C09J 9/02 |

* cited by examiner

*Primary Examiner* — Brian P Mruk
(74) *Attorney, Agent, or Firm* — James J. Cummings

(57) ABSTRACT

The present invention relates to adhesives that are suitable for use as electrically conductive materials in the fabrication of electronic devices, integrated circuits, semiconductor devices, passive components, solar cells, solar modules, and/or light emitting diodes. The adhesive of the present invention comprises one or more epoxy resins, silver-coated particles having a silver content of 2 to 30 wt.-%, based on the total amount of the silver-coated particles, and one or more amine-epoxy adducts, comprising one or more functional groups, each derived from an alkyl-substituted nitrogen-containing heterocycle.

20 Claims, No Drawings

ELECTRICALLY CONDUCTIVE ADHESIVES COMPRISING SILVER-COATED PARTICLES

CROSS-REFERENCE TO RELATED APPLICATIONS

This application is a continuation of International Patent Application No. PCT/EP2012/053775 filed Sep. 19, 2012, which claims the benefit of GB Application Ser. No. 1116240.1 filed Sep. 20, 2011, the contents of both are incorporated herein by reference.

FIELD OF THE INVENTION

The present invention relates to adhesives that are suitable for use as electrically conductive materials in the fabrication and assembly of electronic devices, integrated circuits, semiconductor devices, passive components, solar cells, solar modules, and/or light emitting diodes.

BACKGROUND OF THE INVENTION

Electrically conductive materials are used for a variety of purposes in the fabrication and assembly of electronic devices, integrated circuits, semiconductor devices, passive components, solar cells, solar modules, and/or light emitting diodes.

In general, electrically conductive adhesives (ECAs) provide a mechanical bond between two surfaces and conduct electricity. Typically, ECA formulations are made of a polymer resin filled with electrically conductive metal fillers. The resin generally provides a mechanical bond between two substrates, while the electrically conductive fillers generally provide the desired electrical interconnection.

Typical electrically conductive adhesives require high loadings of electrically conductive fillers which are normally made from expensive conductive metals, such as silver. It is known that the amount of silver can be reduced by using silver-coated metal fillers, e.g. silver-coated copper fillers.

However, the electrical conductivity of adhesive formulations, comprising silver-coated fillers is often significantly reduced compared with formulations based on filler materials made of silver. In addition the stability of formulations containing silver-coated metal fillers is often insufficient at room temperature, which limits the potential use of theses formulations in electronic assembly operations due to thermal instability.

Hence, there is a need for new electrically conductive adhesives that contain a reduced amount of expensive conductive metals, such as silver, and which exhibit a good electrical conductivity and a sufficient stability at room temperature (22° C.).

DETAILED DESCRIPTION OF THE INVENTION

The present invention provides an adhesive and the cured product of said adhesive which both have electrically conducting properties, wherein the worklife of the uncured adhesive at 22° C. is sufficient to use the adhesive in a broad variety of electronic assembly operations.

One aspect of the present invention relates to an adhesive, comprising
a) one or more epoxy resins;
b) silver-coated particles having a silver content of 2 to 30 wt.-%, based on the total amount of the silver-coated particles; and
c) one or more amine-epoxy adducts, comprising one or more functional groups, each derived from an alkyl-substituted nitrogen-containing heterocycle.

Said adhesive exhibits a good electrical conductivity and a sufficient stability at room temperature (22° C.) despite of using silver-coated particles as an inexpensive electrically conductive filler material.

The adhesive of the present invention is thermally curable and can preferably be cured in about 0.1 s to 180 minutes at a temperature within the range of about 50° C. to about 250° C. When cured, the cured products are characterized by their good adhesion, and low volume resistivity.

The adhesive of the present invention is also capable of forming an electrically conductive bond between two substrates and can be used in the fabrication and assembly of electronic devices, integrated circuits, semiconductor devices, passive components, solar cells, solar modules, and/or light emitting diodes.

In this context, the invention also provides a bonded assembly comprising two substrates aligned in a spaced apart relationship, each of which having an inwardly facing surface and an outwardly facing surface, wherein between the inwardly facing surfaces of each of the two substrates an electrically conductive bond is formed by the cured product of the adhesive of the present invention.

Another aspect of the present invention relates to the use of the adhesive of the present invention in the fabrication and/or assembly of electronic devices, integrated circuits, semiconductor devices, passive components, solar cells, solar modules, and/or light emitting diodes.

The adhesive of the present invention comprises one or more epoxy resins as a binder material.

Suitable epoxy resins may include multifunctional epoxy-containing compounds, such as glycidyl ethers of $C_2$-$C_{28}$ diols, $C_1$-$C_{28}$ alkyl- or poly-phenol glycidyl ethers; polyglycidyl ethers of pyrocatechol, resorcinol, hydroquinone, 4,4'-dihydroxydiphenyl methane (or bisphenol F, such as RE-303-S or RE-404-S available commercially from Nippon Kayuku, Japan), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphenyl)methane; polyglycidyl ethers of transition metal complexes; chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; phenol novolac epoxy; cresol novolac epoxy; and combinations thereof.

Among the commercially available epoxy resins suitable for use in the present invention are polyglycidyl derivatives of phenolic compounds, such as those available under the tradenames EPON 825, EPON 826, EPON 828, EPON 1001, EPON 1007 and EPON 1009 from Huntsman, Epiclon EXA 830 CRP, Epiclon EXA 850 CRP, Epiclon EXA 835 LVP from DIC, Epalloy 5000, Epalloy 5001, from CVC Chemicals, cycloaliphatic epoxy-containing compounds such as Araldite CY179 from Huntsman, Epalloy 5200 from CVC Chemicals or Celloxide 2021 P from Daicel or water-borne dispersions under the tradenames EPI-REZ 3510, EPI-REZ 3515, EPI-REZ 3520, EPI-REZ 3522, EPI-REZ 3540 or EPI-REZ 3546 from Hexion; DER 331, DER 332, DER 383, DER 354, and DER 542 from Dow Chemical Co.; GY285 from Huntsman, Inc.; and BREN-S from Nippon Kayaku, Japan. Other suitable epoxy-containing compounds include polyepoxides prepared from polyols and the like and polyglycidyl derivatives of phenol-formaldehyde novolacs, the latter of which are available commercially under the tradenames DEN 431, DEN 438, and DEN 439 from Dow Chemical Company, Epiclon N-740, Epiclon N-770, Epiclon N-775 from DIC and a waterborne dispersion ARALDITE PZ 323 from Huntsman.

Cresol analogs are also available commercially such as ECN 1273, ECN 1280, ECN 1285, and ECN 1299 or Epiclon N-660, Epiclon N-665, Epiclon N-670, Epiclon N-673, Epiclon N-680, Epiclon N-695 from DIC or waterborne dispersions ARALDITE ECN 1400 from Huntsman, Inc. SU-8 and EPI-REZ 5003 are bisphenol A-type epoxy novolacs available from Hexion.

Of course, combinations of different epoxy resins are also desirable for use herein.

In a particular preferred embodiment the total amount of all epoxy resins present in the adhesive of the present invention is in the range of about 3 to about 25 wt.-%, preferably in the range of about 5 to about 18 wt.-%, and more preferably in the range of about 6 to about 15 wt.-%, each based on the total amount of the adhesive of the present invention.

In further embodiments of the present invention other resins, such as vinyl resins, phenolic resins, polyimide resins, silicon-containing resins, benzoxazine resins, and/or combinations thereof can be used in combination with the aforementioned one or more epoxy resins.

The adhesive of the present invention further comprises silver-coated particles having a silver content of about 2 to about 30 wt.-%, based on the total amount of the silver-coated particles.

The term "silver-coated particles", as used herein, refers to particles having a core-shell structure, wherein the core is substantially free of silver while the shell consists of silver. In these silver-coated particles the silver shell acts as a coating or layer, which at least partially encompasses the core.

The term "substantially free of silver" relates to core-shell particles, wherein the core of said core-shell particles comprises less than 0.5 wt.-%, preferably less than 0.1 wt.-%, and particularly preferably less than 0.01 wt.-% of silver.

The silver-coated particles used in the present invention are electrically conductive particulate materials, which can have different shapes, such as spherical, flat, flake-like and/or dendritic shapes.

The particle to which the silver coating is applied can comprise or consist of metals or other organic or inorganic materials, such as boron nitride or glass. However, to increase the conductivity of the silver-coated particles, it is preferred that the silver-coated particles are selected from silver-coated metal particles. In a preferred embodiment the metal of the silver-coated metal particles is selected from copper, platinum, palladium, gold, tin, indium, aluminum or bismuth, or any combination thereof. Particularly preferred silver-coated particles are selected from silver-coated copper particles, because silver-coated copper particles are relatively inexpensive and have electrical and thermal properties similar to silver.

The stability and volume resistivity of the adhesive of the present invention can further be improved, if micron-sized silver-coated particles having a silver content of about 2 to about 30 wt.-% are used. In a preferred embodiment of the present invention silver-coated particles according to the invention are used which have an average particle size of about 0.5 µm to about 20 µm, more preferably of about 1 µm to about 5 µm.

As used herein, the term "average particle size" refers to the $D_{50}$ value of the cumulative volume distribution curve at which 50% by volume of the particles have a diameter less than said value. The average particle size or $D_{50}$ value is measured in the present invention through laser diffractometry, preferably using a Malvern Mastersizer 2000 available from Malvern Instruments Ltd. In this technique, the size of particles in suspensions or emulsions is measured using the diffraction of a laser beam, based on application of either Fraunhofer or Mie theory. In the present invention, Mie theory or a modified Mie theory for non-spherical particles is applied and the average particle sizes or $D_{50}$ values relate to scattering measurements at an angle from 0.02 to 135 degrees relative to the incident laser beam. For the measurement it is further on preferred that a dispersion of the particles in a suitable liquid, such as acetone, is prepared by using ultrasonication. In order to produce an acceptable signal-to-noise ratio the particle concentration in the dispersion/suspension should preferably be chosen in a way that an obscuration between 6% to 20% is obtained.

In a particular preferred embodiment of the present invention silver-coated copper particles having a silver content of about 2 to about 30 wt.-% are used, wherein said silver-coated copper particles have an average particle size of about 0.5 µm to about 20 µm, more preferably of about 1 µm to about 5 µm.

As noted above, the silver content of the silver-coated particles is from about 2 to about 30 wt.-%. When the amount of silver coating exceeds 30 wt.-%, the costs tend to increase. When it is less than 2 wt.-% the processing viscosity of the uncured adhesive and the volume resistivity of the cured product increases in an undesirable manner and the stability of the uncured adhesive at 22° C. is often insufficient.

A particularly good and stable processing viscosity, and low volume resistivity is obtained when silver-coated particles are used which have a silver content of about 6 to about 15 wt.-%, more preferably of about 8 to about 12 wt.-%, each based on the total amount of the silver-coated particles.

The silver-coated particles according to the invention may be present in the adhesive in an amount of about 60 to about 90 wt.-%, based on the total amount of the adhesive of the present invention. By using an amount of about 60 to about 90 wt.-% of silver-coated particles having the aforementioned silver content in the adhesives of the present invention, cured products of said adhesives can be obtained, which exhibit good conductivity, reduced volume resistivity and good adhesion.

In one embodiment, silver-coated particles according to the invention are present in an amount of about 65 to about 85 wt.-%, and more preferably in an amount of about 72 to about 82 wt.-%, each based on the total amount of adhesive of the present invention.

In another embodiment, silver-coated copper particles according to the invention are present in an amount of about 65 to about 80 wt.-%, and more preferably in an amount of about 70 to about 75 wt.-%, each based on the total amount of adhesive of the present invention.

Of course, combinations of different silver-coated particles are also desirable for use herein.

In the present invention the method for producing the silver-coated particles is not particularly limited. Suitable methods include displacement plating, electroplating and electroless plating, wherein the displacement plating technology is preferable for producing silver-coated copper particles since the adhesion between the copper particles and silver is strong and the running costs are low.

Suitable silver-coated particles are presently available commercially from several companies, such as Ferro Corp., Technic Inc., Eckart GmbH, Ames Goldsmith Corp., Dowa Holdings Co., Ltd., Mitsui, Fukuda, Potters Industries Inc. and Metalor Technologies.

In order to optimize the electrical conducting properties of the adhesive of the present invention, said adhesive may additionally comprise electrically conductive particles which are different from the silver-coated particles used in the present invention. In the following these particles are also referred to as additional electrically conductive particles.

Preferably, the aforementioned additional electrically conductive particles are non-silver-coated particles. In other words these particles are a particulate material which does not exhibit a silver-coating layer on its surface.

The additional electrically conductive particles may be selected from metal particles, non-silver coated particles or metal alloy particles and/or combinations thereof, wherein the additional electrically conductive particles preferably comprise or essentially consist of copper, silver, platinum, palladium, gold, tin, indium, aluminum or bismuth and/or combinations thereof.

The term "essentially consist of", as used herein, includes electrically conductive particles which comprise non-intentionally added impurities, wherein the amount of said impurities is less than 0.2 wt.-%, preferably less than 0.1 wt.-%, and more preferably less than 0.01 wt.-%, based on the total amount of the additional electrically conductive particles of the present invention.

Desirably, the additional electrically conductive particles essentially consist of silver. In an alternative embodiment of the present invention, the additional electrically conductive particles comprise or consist of carbon black, carbon fibers or graphite.

Preferably, the additional electrically conductive particles have an average particle size of about 1 µm to about 20 µm and more preferably of about 1.5 µm to about 10 µm, wherein the average particle size is determined as described above.

Of course, combinations of different additional electrically conductive particles are also desirable for use herein.

The additional electrically conductive particles may be present in the inventive adhesive in an amount of about 0.1 to about 30 wt.-%, more preferably about 1 to about 15 wt.-%, each based on the total amount of the adhesive of the present invention.

The additional electrically conductive particles are presently available commercially from several companies, such as Ferro Corp., Technic Inc., Ames Goldsmith Corp., Dowa Holdings Co., Ltd., Fukuda, Mitsui, and Metalor Technologies.

In one embodiment the adhesive of the present invention comprises a mixture of silver-coated particles having a silver content of 2 to 30 wt.-%, and additional electrically conductive particles, wherein the silver-coated particles are present in an amount of about 60 to about 90 wt.-% and the additional electrically conductive particles are present in an amount of about 0.1 to about 30 wt.-%, each based on the total amount of the adhesive of the present invention.

More preferably, the adhesive of the present invention comprises a mixture of silver-coated copper particles according to the present invention and additional electrically conductive particles consisting essentially of silver, wherein the silver-coated copper particles are present in an amount of about 60 to about 90 wt.-% and the additional electrically conductive particles consisting essentially of silver are present in an of about 0.1 to about 30 wt.-%, each based on the total amount of the adhesive of the present invention.

By using the aforementioned specific combinations of different particles, the volume resistivity and contact resistance of the cured product of the adhesive of the present invention can be improved.

The adhesive of the present invention further comprises one or more amine-epoxy adducts, wherein the amine-epoxy adduct comprises one or more functional groups, each derived from an alkyl-substituted nitrogen-containing heterocycle.

The term "amine-epoxy adduct", as used in the present invention, refers to a product of the reaction between one or more amine compounds and one or more epoxy compounds. The amine-epoxy product is incapable or only has very low capability to initiate and/or catalyze the curing or crosslinking reaction of the epoxy resin component of the adhesive of the present invention at 22° C., but is capable to initiate and/or catalyze the curing or crosslinking reaction at higher temperatures, for example at temperatures of 45° C. to 250° C. Such compounds are also known as heat-activatable or latent curing agents. Preferably, the amine-epoxy adduct according to the present invention is a solid which is insoluble in the epoxy resin component of the adhesive of the present invention at 22° C., but which becomes soluble or melts upon heating and functions as a curative (hardener) to cure the epoxy resin component of the adhesive of the present invention.

The term "derived from" as used herein means that the functional group of the amine-epoxy adduct of the present invention is formed by formally removing one hydrogen atom from the nitrogen-containing heterocycle.

The term "alkyl-substituted nitrogen-containing heterocycle", as used in the present invention, refers to a nitrogen-containing heterocycle where at least one hydrogen atom of the nitrogen-containing heterocycle is replaced by an alkyl group. Preferred alkyl-substituted nitrogen-containing heterocycles include alkyl-substituted nitrogen-containing heterocycles having from 5 to 7 ring members. Particularly preferred alkyl-substituted nitrogen-containing heterocycles are selected from alkyl-substituted aromatic nitrogen-containing heterocycles, such as alkyl-substituted pyridines or alkyl-substituted imidazoles.

The functional groups derived from an alkyl-substituted nitrogen-containing heterocycle are preferably bound covalently to an oligomeric or polymeric backbone. In particular preferred embodiment the amine-epoxy adduct according to the present invention comprises one or more functional groups derived from an alkyl-substituted imidazole.

Suitable alkyl-substituted imidazole groups are selected from residues of formula (I),

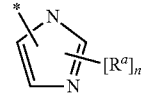

formula (I)

where n is an integer from 1 to 3 and each $R^a$ is $C_{6-12}$ aryl; $C_{1-20}$ alkyl, optionally containing one or more substituents selected from hydroxyl, thiol, carboxyl or amide; $C_{2-20}$ alkenyl, optionally containing one or more substituents selected from hydroxyl, thiol, carboxyl or amide; with the proviso that at least one $R^a$ is $C_{1-20}$ alkyl, optionally containing one or more substituents selected from hydroxyl, thiol, carboxyl or amide.

The integer n indicates the number of hydrogen atoms of the imidazole heterocycle that are replaced by $R^a$ groups. For example, if n is 2, two hydrogen atoms of the imidazole heterocycle are replaced by two $R^a$ groups, wherein the two $R^a$ are the same or different.

Preferred alkyl-substituted imidazole groups are selected from residues of formula (Ia),

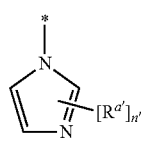

formula (Ia)

wherein n' is an integer from 1 to 3 and each $R^{a'}$ is $C_{6-12}$ aryl; $C_{1-20}$ alkyl, optionally containing one or more substituents selected from hydroxyl, thiol, carboxyl or amide; $C_{2-20}$ alkenyl, optionally containing one or more substituents selected from hydroxyl, thiol, carboxyl or amide; with the proviso that at least one $R^{a'}$ is $C_{1-20}$ alkyl, optionally containing one or more substituents selected from hydroxyl, thiol, carboxyl or amide. More preferably $R^{a'}$ is an unsubstituted $C_{1-20}$ alkyl, particularly preferably an unsubstituted $C_{1-5}$ alkyl group, such as methyl.

In a particular preferred embodiment of the present invention n is 1. Preferred alkyl-substituted imidazole residues are selected from 2-methyl-3-imidazolyl, 4-methyl-3-imidazolyl, 5-methyl-3-imidazolyl, 2,4-dimethyl-3-imidazolyl, 2,5-dimethyl-3-imidazolyl, 4,5-dimethyl-3-imidazolyl, 2,4,5-trimethyl-3-imidazolyl, 2-ethyl-4-methyl-3-imidazolyl, 2-heptadecyl-3-imidazolyl, 2-ethyl-3-imidazolyl, 4-ethyl-3-imidazolyl, 5-ethyl-3-imidazolyl, 2,4-diethyl-3-imidazolyl, 2,5-diethyl-3-imidazolyl, 4,5-diethyl-3-imidazolyl, 2,4,5-triethyl-3-imidazolyl, 2-propyl-3-imidazolyl, 2-propyl-4,5-dimethyl-3-imidazolyl, 2-octyl-4-hexyl-3-imidazolyl, 2-undecyl-3-imidazolyl, 2-ethyl-4-phenyl-3-imidazolyl, 2-butyl-5-methyl-3-imidazolyl, 1-(2-hydroxy-3-phenoxypropyl)-2-methyl-3-imidazolyl, 1-(2-hydroxy-3-phenoxypropyl)-2-ethyl-4-methyl-3-imidazolyl, 1-(2-hydroxy-3-butoxypropyl)-2-methyl-3-imidazolyl, 1-(2-hydroxy-3-butoxypropyl)-2-ethyl-4-methyl-3-imidazolyl, 1-cyanoetheyl-2-ethyl-4-methyl-3-imidazolyl, 2-phenyl-4-methyl-5-hyroxymethyl-3-imidazolyl, or 1-benzyl-2-methyl-3-imidazolyl.

Particularly preferred alkyl-substituted imidazole residues are selected from 2-methyl-3-imidazolyl, 4-methyl-3-imidazolyl, 5-methyl-3-imidazolyl, 2,4-dimethyl-3-imidazolyl, 2,5-dimethyl-3-imidazolyl, 4,5-dimethyl-3-imidazolyl, or 2,4,5-trimethyl-3-imidazolyl.

It is essential that the amine-epoxy adduct according to the present invention comprises one or more functional groups derived from an alkyl-substituted nitrogen-containing heterocycles, because by combining these specific latent curing agents with silver-coated particles having a silver content of 2 to 30 wt.-%, adhesive formulations can be obtained, which have particularly advantageous properties. For example, these adhesives have a low volume resistivity even when cured in the presence of oxygen. Thus, the adhesive of the present invention does not require an inert atmosphere during its curing process. A particular good stability of the adhesive of the present invention is obtained, when silver-coated particles having a silver content of 2 to 30 wt.-%, preferably of 6 to 15 wt.-%, are used in combination with amine-epoxy adducts which comprise one or more functional groups, each derived from an alkyl-substituted imidazole.

Desirably, the amine-epoxy adducts used in the present invention are oligomeric or polymeric compounds. Preferred amine-epoxy adducts have a weight average molecular weight ($M_w$) of at least 200 g/mol, more preferably in the range of about 800 g/mol to about 1500 g/mol.

In the present invention the weight average molecular weight ($M_w$) is determined by gel permeation chromatography (GPC), preferably using a polystyrene standard.

Preferably, the amine-epoxy adduct used in the present invention is obtained by reacting i) one or more polyfunctional epoxy compounds and ii) one or more alkyl-substituted nitrogen-containing heterocycles, optionally in the presence of iii) one or more compounds that are capable of reacting with the polyfunctional epoxy compound and/or alkyl-substituted nitrogen-containing heterocycle.

The polyfunctional epoxy compound may be any compound having two or more oxirane groups in the molecule. It includes, for example, polyglycidyl ether obtained by reacting a polyhydric phenol (such as bisphenol A, bisphenol F, catechol, resorcinol) or a polyhydric alcohol (such as glycerin and polyethylene glycol) with epichlorohydrin; glycidyl ether ester obtained by reacting a hydroxycarboxylic acid (such as p-hydroxybenzoic acid and (3-hydroxynaphthoic acid) with epichlorohydrin; polyglycidyl ester obtained from a polycarboxylic acid, such as terephthalic acid; glycidylamine compounds obtained from 4,4'-diaminodiphenylmethane and m-aminophenol; and epoxidized novolak and epoxidized polyolefin.

The alkyl-substituted nitrogen-containing heterocycle may be any nitrogen-containing heterocycle where at least one hydrogen atom of the heterocycle is replaced by an alkyl group.

Preferred alkyl-substituted nitrogen-containing heterocycles are selected from alkyl-substituted nitrogen-containing aromatic heterocycles, such as alkyl-substituted imidazoles.

Suitable alkyl-substituted imidazoles are selected from compounds of formula (II),

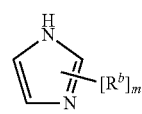

formula (II)

where m is an integer from 1 to 3 and each $R^b$ is $C_{6-12}$ aryl; $C_{1-20}$ alkyl, optionally containing one or more substituents selected from hydroxyl, thiol, carboxyl or amide; $C_{2-20}$ alkenyl, optionally containing one or more substituents selected from hydroxyl, thiol, carboxyl or amide; with the proviso that at least one $R^a$ is $C_{1-20}$ alkyl, optionally containing one or more substituents selected from hydroxyl, thiol, carboxyl or amide. More preferably $R^b$ is an unsubstituted $C_{1-20}$ alkyl, particularly preferably an unsubstituted $C_{1-5}$ alkyl group, such as methyl.

The integer m indicates the number of hydrogen atoms of the imidazole heterocycle that are replaced by $R^b$ groups. For example, if n is 2, two hydrogen atoms of the imidazole heterocycle are replaced by two $R^b$ groups, wherein the two $R^b$ are the same or different.

In a particular preferred embodiment of the present invention m is 1.

Preferred alkyl-substituted imidazoles are selected from 2-methylimidazole, 4-methylimidazole, 5-methylimidazole, 2,4-dimethylimidazole, 2,5-dimethylimidazole, 4,5-dimethylimidazole, 2,4,5-trimethylimidazole, 2-ethylimidazole, 4-ethylimidazole, 5-ethylimidazole, 2,4-diethylimidazole, 2,5-diethylimidazole, 4,5-diethylimidazole, 2,4,5-triethylimidazole, 2-ethyl-4-methylimidazole, 2-heptadecylimidazole, 2-propylimidazole, 2-propyl-4,5-dimethylimidazole, 2-octyl-4-hexylimidazole, 2-undecylimidazole, 2-ethyl-4-phenylimidazole, 2-butyl-5-methylimidazole, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, 1-cyanoetheyl-2-ethyl-4-methylimidazole, 2-phenyl-4-methyl-5-hyroxymethylimidazole, or 1-benzyl-2-methylimidazole.

Particularly preferred alkyl-substituted imidazoles are selected from 2-methylimidazole, 4-methylimidazole, 5-methylimidazole, 2,4-dimethylimidazole, 2,5-dimethylimidazole, 4,5-dimethylimidazole or 2,4,5-trimethylimidazole.

Compounds that are capable of reacting with the polyfunctional epoxy compound and/or alkyl-substituted nitrogen-containing heterocycle are preferably selected from polyhydric phenols, such as bisphenol A, bisphenol F, bisphenol S, hydroquinone, catechol, or resorcinol; polyhydric alcohols, such as trimethylol propane; amine compounds such as piperazine, aniline, and cyclohexylamine; polybasic carboxylic acids, such as adipic acid, phthalic acid and 3,9-bis(2-carboxy-ethyl)-2,4,8,10-tetroxaspiro[5,5]-undecane; polythiols, such as 1,2-dimercaptoethane and 2-mercaptoethylether; hydrazides, such as phenylacetic acid hydrazide; amino acids such as alanine and valine; compounds having two or more of different functional groups in the molecule, such as 2-mercaptoethanol, 1-mercapto-3-phenoxy-2-propanol, mercaptoacetic acid, N-methylethanolamine, diethanolamine, hydroxyaniline, N-methyl-o-aminobenzoic acid, anthranilic acid and lactic acid.

Carboxylic acid anhydrides, carboxylic acids, phenolic novolac resins, water, metal salts and the like may also be utilized as additional reactants in the preparation of the amine-epoxy adduct or to further modify the adduct once the amine and epoxy have been reacted.

As mentioned above, it is preferred that the amine-epoxy adduct used in the present invention is a solid which is insoluble in the epoxy resin component at 22° C., but which becomes soluble or melts upon heating and thereby functions as a curative (hardener) to cure the adhesive. In order to ensure a high stability of the adhesive at 22° C. and a good compatibility with the epoxy resin at higher temperatures, it is preferred that the amine-epoxy adduct of the present invention has a glass transition temperature ($T_g$) of about 40° C. to about 160° C., more preferably of about 60° C. to 140° C.

The glass transition temperature ($T_g$) of the amine-epoxy adduct is determined by DSC (Differential scanning calorimetry). The glass transition temperature ($T_g$) can be determined by placing 10 mg of the material in an aluminum cup which is heated first to 140° C., then cooled down to 25° C. and then heated up again to 250° C. versus a control at a typical rate of 10° C./min. The glass transition temperature ($T_g$) will result in an endothermic shift of the baseline. The glass transition temperature ($T_g$) is indicative for the heat activation of the amine-epoxy adduct.

The amine-epoxy adduct of the present invention can be obtained by mixing components (i) and (ii), or components (i), (ii), and (iii) at 22° C., reacting at 80° C. to 150° C., cooling, solidifying, and crushing. It can also be prepared by performing the reaction in one or more solvents, such as tetrahydrofuran, dioxane, and/or methyl ethyl ketone, removing the solvent(s), and crushing the solid. It is preferred that components (i) and (ii) are reacted in a ratio of 0.8 to 2.5 equivalent, preferably 0.9 to 1.5 equivalent of oxirane groups in component (i) for 1 equivalent of N—H groups of the nitrogen-containing heterocycle in component (ii).

Methods for preparing the amine-epoxy adduct of the present invention are also known in the art and are described, for example, in U.S. Pat. No. 4,066,625 and EP Patent application No. 0 569 044 A1.

The amine-epoxy adduct of the present invention can be used in combination with other known curing agent, such as acid anhydrides, dicyandiamide, dibasic acid hydrazides and melamines. However, it is preferred that no other curing agents are used in combination with the amine-epoxy adduct of the present invention, because by using the aforementioned adduct as the only curing agent, a particular good stability and low volume resistivity can be realized.

The amine-epoxy adduct of the present invention can be used in an amount of 0.5 to 50 parts by weight for 100 parts by weight of epoxy resin. Preferably, the adhesive of the present invention comprises one or more amine-epoxy adducts according to the present invention in an amount of 1 to 10 wt.-%, more preferably in an amount of 2 to 8 wt.-%, and particularly preferably in an amount of 4 to 6 wt.-%, each based on the total amount of the adhesive.

In another embodiment the adhesive of the present invention further comprises one or more additives, such as plasticizers, oils, stabilizers, antioxidants, anti-corrosion agents, chelating agents, pigments, dyestuffs, polymeric additives, defoamers, preservatives, thickeners, rheology modifiers, humectants, adhesion promoters, dispersing agents, organic solvents and water. For some applications it may be desirable that the adhesive of the present invention does not comprise an additive selected from the group consisting of ZnO, $Sb_2S_3$, and $V_2O_3$.

When used, additives are used in an amount sufficient to provide the desired properties. One or more additives may be present in the inventive adhesive in an amount in the range of about 0.05 to about 20 wt.-%, preferably in an amount in the range of about 1 wt.-% to about 10 wt.-%, and more preferably in an amount in the range of about 2 wt.-% to about 5 wt.-%, each based on the total amount of the inventive adhesive. Of course, combinations of different additives are also desirable for use herein.

One typical formulation of the adhesive of the present invention comprises or consists of, based on the total amount of the adhesive:
 a) from about 3 to about 25 wt.-% of one or more epoxy resins,
 b) from about 60 to about 90 wt.-% of silver-coated particles having a silver content of 2 to 30 wt.-%, based on the total amount of the silver-coated particles,
 c) from about 1 to about 10 wt.-% of one or more amine-epoxy adducts, comprising one or more functional groups, each derived from an alkyl-substituted nitrogen-containing heterocycle,
 d) from 0 to about 30 wt.-% of electrically conductive particles, which are different from component b)
 e) from 0 to about 20 wt.-% of one or more additives.

Another typical formulation of the adhesive of the present invention comprises or consists of, based on the total amount of the adhesive:
- a) from about 3 to about 25 wt.-% of one or more epoxy resins,
- b) from about 60 to about 90 wt.-% of silver-coated metal particles having a silver content of 2 to 30 wt.-%, based on the total amount of the silver-coated particles,
- c) from about 1 to about 10 wt.-% of one or more amine-epoxy adducts, comprising one or more functional groups, each derived from an alkyl-substituted nitrogen-containing aromatic heterocycle,
- d) from 0 to about 30 wt.-% of electrically conductive particles, which are different from component b)
- e) from 0 to about 20 wt.-% of one or more additives.

A further typical formulation of the adhesive of the present invention comprises or consists of, based on the total amount of the adhesive:
- a) from about 3 to about 25 wt.-% of one or more epoxy resins,
- b) from about 60 to about 90 wt.-% of silver-coated copper particles having a silver content of 2 to 30 wt.-%, based on the total amount of the silver-coated particles,
- c) from about 1 to about 10 wt.-% of one or more amine-epoxy adducts, comprising one or more functional groups, each derived from an alkyl-substituted imidazole,
- d) from 0 to about 30 wt.-% of electrically conductive particles, which are different from component b)
- e) from 0 to about 20 wt.-% of one or more additives.

The adhesive of the present invention, which is an electrically conductive adhesive, can find use as lead-free solder replacement technology, general interconnect technology, die attach adhesive, and so forth. Electronic devices, integrated circuits, semiconductor devices, solar cells and/or solar modules and other devices employing the present adhesive may be used in a wide variety of applications throughout the world, including energy production, personal computers, control systems, telephone networks, automotive electronics, displays, semiconductor packages, passive devices, and handheld devices.

When cured, the cured product of adhesive of the present invention forms a stable electrical conductive interconnection between two surfaces, wherein said interconnection provides a good resistance to thermomechanical or mechanical fatigue and a high electrical conductivity and low contact resistance.

A further aspect of the present invention is the cured product of the adhesive of the present invention. Said adhesive can preferably be cured in about 0.1 s to 180 minutes at a temperature within the range of about 50° C. to about 250° C., preferably within the range of about 70° C. to about 220° C., and more preferably within the range of about 90° C. to about 200° C.

In a preferred embodiment the inventive adhesive is cured at 120° C. to 180° C. in less than 180 minutes, preferably less than 60 minutes, and more preferably less than 15 minutes. The curing of the inventive adhesive can be performed by heating the formulation, e.g. by using IR lamps or conventional heating techniques.

Another aspect of the present invention is a bonded assembly comprising two substrates aligned in a spaced apart relationship, each of which having an inwardly facing surface and an outwardly facing surface, wherein between the inwardly facing surfaces of each of the two substrates an electrically conductive bond is formed by the cured product of the adhesive of the present invention.

This invention is further illustrated by the following representative examples.

EXAMPLES

Epoxy resin: Bisphenol-F-epichlorohydrin resin;
Epoxy resin diluent 1: Neodecanoic acid, 2,3-epoxypropyl ester;
Epoxy resin diluent 2: Trimethylolpropane triglycidyl ether;
Adhesion Promoter: 3-Glycidoxypropyltrimethoxysilane;
Dispersion agent: Solution of colpolymers from Byk Chemie;
Solvent: Butoxyethoxyethyl acetate;
Silver-coated copper 1: CG-SAB-121 from Dowa Holdings Co., Ltd. (silver content of about 11 wt.-%);
Silver-coated copper 2: FAC-610 from Ames Goldsmith Corp. (silver content of about 10 wt.-%)
Silver-coated copper 3: CG-SAB-234 from Dowa Holdings Co., Ltd. (silver content of about 11 wt.-%);
Silver-coated copper 4: CG-SAB-235 from Dowa Holdings Co., Ltd. (silver content of about 1 wt.-%);
Silver-coated copper 5: NZS from Ames Goldsmith Corp (silver content of about 1 wt.-%);
IBAEA: Amine-epoxy adduct, comprising one or more functional groups, each derived from methyl-substituted imidazole;
Ancamine 2014: Non-cyclic aliphatic amine-epoxy adduct from Air Products;
Ancamine 2337: Non-cyclic aliphatic amine-epoxy adduct from Air Products;
Ajicure MY24: Non-cyclic aliphatic amine-epoxy adduct from Ajinomoto Inc.;
DICY: Dicyandiamide from AlzChem Trostberg GmbH;
HXA 3932: Encapsulated imidazole from Asahi Kasei.

The adhesives of the present invention and comparative formulations were prepared by simply mixing the aforementioned components. The quantities of each component of the inventive and comparative formulations are given in Table 1 and 3 in parts by weight.

TABLE 1

Formulations, comprising different latent hardeners

| | 1 (Inv) | 2[a] | 3[a] | 4[a] | 5[a] |
|---|---|---|---|---|---|
| Epoxy resin | 17.170 | 17.170 | 17.170 | 17.170 | 17.170 |
| Epoxy resin diluent 1 | 1.012 | 1.012 | 1.012 | 1.012 | 1.012 |
| Epoxy resin diluent 2 | 2.148 | 2.148 | 2.148 | 2.148 | 2.148 |
| Adhesion Promoter | 0.332 | 0.332 | 0.332 | 0.332 | 0.332 |
| Dispersion agent | 0.645 | 0.645 | 0.645 | 0.645 | 0.645 |
| Solvent | 1.012 | 1.012 | 1.012 | 1.012 | 1.012 |
| Silver-coated copper 1 (11 wt. % Ag) | 73.293 | 73.293 | 73.293 | 73.293 | 73.293 |
| IBAEA | 4.388 | — | — | — | — |
| Ancamine 2014 | — | — | — | 0.607 | 4.388 |
| Ancamine 2337 | — | — | — | 0.607 | — |
| Ajicure MY24 | — | 4.388 | — | — | — |
| DICY | — | — | 2.412 | — | — |
| HXA 3932 | — | — | — | — | 4.388 |

[a]Comparative example

The adhesive formulation and the cured products of the adhesive formulations were characterized by using the following analytical methods:

Viscosity

The viscosity was measured at 25° C. using an AR 1000 rheometer from TA instruments. For the measurement, a 2 cm plate geometry and a 200 micron gap was used. The shear rate applied was 15 s$^{-1}$. The initial viscosity was determined directly after the formulations were prepared by mixing the components. To determine the storage stability of the formulations the viscosity was repeatedly determined after the formulations were stored at 40° C. at a relative humidity of 85% for the given period of time.

Volume Resistivity

The volume resistivity was determined in the following manner: aliquots of the prepared formulations were drawn down the surface of glass slides giving strips with strip dimensions of 5 cm length, 5 mm width and approximately 50 micron thickness. The samples were cured by placing them on a pre-heated hotplate (180° C.) for 1 minute. After curing the strips were approximately 0.005 to 0.03 cm thick.

Resistance was determined by measuring the voltage (V) drop along a 5 cm strip while passing current (I) through the strip, (R=V/I). Three separate strips were prepared and measured for resistance and dimensions. The volume resistivity (Rv) was calculated for each strip using the formula Rv=(R(w)(t)/L) where R is the electrical resistance of the sample in ohms measured using an ohmmeter or equivalent resistance measuring device, w and t are the width and thickness of the sample, in centimeters, and L is the distance in centimeters between the electrical conductors of the resistance measuring device. Volume resistivity units are reported in Ohm·cm.

TABLE 2

Volume resistivity and viscosity of the formulations of Table 1

| | 1 (Inv.) | 2[a] | 3[a] | 4[a] | 5[a] |
|---|---|---|---|---|---|
| Volume resistivity [Ohm · cm] | 3.12E−03 | Not completely cured/No conductivity | 4.99E+03 | 5.01E+01 | Not completely cured/No conductivity |
| Viscosity [Pa s] | | | | | |
| Initial | 11.31 | 54.94 | 9.73 | 8.91 | 4.74 |
| 1 week | 12.31 | 71.59 | 7.12 | 11.55 | 4.63 |
| 2 weeks | 12.15 | 77.22 | 7.15 | 12.77 | 5.04 |
| 3 weeks | 13.19 | 98.82 | 7.00 | 12.36 | 4.50 |
| 4 weeks | 12.01 | 96.15 | 7.65 | 13.37 | 5.17 |
| 5 weeks | 13.56 | 97.45 | 7.08 | 14.06 | 4.76 |
| 6 weeks | 13.38 | 174.1 | 6.99 | 12.75 | 5.09 |

[a]Comparative example

TABLE 3

Formulations, comprising different silver-coated copper particles

| | 6 (Inv.) | 7 (Inv.) | 8 (Inv.) | 9[a] | 10[a] | 11[a] | 12 (Inv.) | 13 (Inv.) | 14[a] | 15[a] |
|---|---|---|---|---|---|---|---|---|---|---|
| Epoxy resin | 22.502 | 16.073 | 9.644 | 22.502 | 16.073 | 9.644 | 28.931 | 22.502 | 28.931 | 22.502 |
| Epoxy resin diluent 1 | 1.326 | 0.947 | 0.568 | 1.326 | 0.947 | 0.568 | 1.705 | 1.326 | 1.705 | 1.326 |
| Epoxy resin diluent 2 | 2.818 | 2.011 | 1.206 | 2.818 | 2.011 | 1.206 | 3.619 | 2.818 | 3.619 | 2.818 |
| Adhesion Promoter | 0.435 | 0.311 | 0.186 | 0.435 | 0.311 | 0.186 | 0.559 | 0.435 | 0.559 | 0.435 |
| Dispersion agent | 0.845 | 0.604 | 0.362 | 0.845 | 0.604 | 0.362 | 1.087 | 0.845 | 1.087 | 0.845 |
| Solvent | 1.326 | 0.947 | 0.568 | 1.326 | 0.947 | 0.568 | 1.705 | 1.326 | 1.705 | 1.326 |
| IBAEA | 5.751 | 4.108 | 2.465 | 5.751 | 4.108 | 2.465 | 7.394 | 5.751 | 7.394 | 5.751 |
| Silver-coated copper 2 (10 wt. % Ag) | — | — | — | — | — | — | 55.00 | 65.00 | — | — |
| Silver-coated copper 3 (11 wt. % Ag) | 65.00 | 75.00 | 85.00 | — | — | — | — | — | — | — |
| Silver-coated copper 4 (1 wt. % Ag) | — | — | — | 65.00 | 75.00 | 85.00 | — | — | — | — |
| Silver-coated copper 5 (1 wt. % Ag) | — | — | — | — | — | — | — | — | 55.00 | 65.00 |
| Volume resistivity [Ohm · cm] | 3.8E+03 | 1.2E−02 | 4.3E−03 | n.d.[b] | 4.1E−02 | 2.6E−02 | 4.4E−03 | 1.5E−03 | n.d.[b] | n.d.[b] |
| Initial viscosity [Pa s] | 4.42 | 17.96 | 42.10 | 4.65 | 22.65 | 115.30 | 5.90 | 29.73 | 55.59 | n.d.[c] |

[a]Comparative example
[b]not determined (volume resistivity too high to be determined)
[c]not determined (initial viscosity too high to be determined)

The comparison of Examples 1 with 2 to 5 (Table 1 and 2) clearly demonstrates, that the use of amine-epoxy adducts, comprising one or more functional groups, each derived from an alkyl-substituted nitrogen-containing heterocycle as latent curing agents is advantageous. By combining these compounds with silver-coated copper particles having a silver content of 2 to 30 wt.-%, adhesive formulations were obtained, which exhibited a low volume resistivity and good storage stability. In all other comparative examples the volume resistivity was too high and/or the storage stability was insufficient.

In Table 3 the importance of the silver-content of the silver-coated copper particles is shown. While the volume resistivity and initial viscosity of formulations 6 to 8 and 12 to 13, which all comprise silver-coated copper particles having a silver content of 10 wt.-% or 11 wt.-%, was in an acceptable range, the volume resistivity and initial viscosity of the comparative formulations 9 to 11 and 14 to 15 was significantly higher.

The invention claimed is:
1. An adhesive, comprising
   a) a resin component consisting of
      one or more epoxy resins, and
      optionally one or more resins selected from the group consisting of vinyl resins, phenolic resins, polyimide resins, silicon-containing resins and benzoxazine resins;
   b) silver-coated particles having a silver content of 2 to 30 wt.-%, based on the total amount of the silver-coated particles; and
   c) one or more amine-epoxy adducts, comprising one or more functional groups, each derived from an alkyl-substituted nitrogen-containing heterocycle.
2. The adhesive according to claim 1, wherein the silver-coated particles are selected from silver-coated metal particles.
3. The adhesive according to claim 2, wherein the metal of the silver-coated metal particles is selected from the group consisting of copper, platinum, palladium, gold, tin, indium, aluminum or bismuth, or any combination thereof.
4. The adhesive according to claim 3, wherein the silver-coated particles are selected from silver-coated copper particles.
5. The adhesive according to claim 1, wherein the silver-coated particles have an average particle size of 0.5 µm to 20 µm.
6. The adhesive according to claim 1, wherein the silver-coated particles have a silver content of 6 to 15 wt.-%, based on the total amount of the silver-coated particles.
7. The adhesive according to claim 1, wherein the adhesive comprises the silver-coated particles in an amount of 60 to 90 wt.-%, based on the total amount of the adhesive.
8. The adhesive according to claim 1, wherein the adhesive additionally comprises d) electrically conductive particles, which are different from component b).
9. The adhesive according to claim 8, wherein the adhesive comprises the electrically conductive particles in an amount of 0.1 to 30 wt.-%, based on the total amount of the adhesive.
10. The adhesive according to claim 8, wherein the electrically conductive particles are selected from non-silver coated metal particles consisting essentially of silver.
11. The adhesive according to claim 1, wherein the amine-epoxy adduct is obtained by reacting i) one or more polyfunctional epoxy compounds and ii) one or more alkyl-substituted nitrogen-containing heterocycles, optionally in the presence of iii) one or more compounds that are capable of reacting with the polyfunctional epoxy compound and/or alkyl-substituted nitrogen-containing heterocycle.
12. The adhesive according to claim 11, wherein the polyfunctional epoxy compound is a polyglycidyl ether of a polyhydric phenol.
13. The adhesive according to claim 1, wherein the alkyl-substituted nitrogen-containing heterocycle is selected from alkyl-substituted imidazoles.
14. The adhesive according to claim 13, wherein the alkyl-substituted nitrogen-containing heterocycle is selected from methyl-substituted imidazoles.
15. The adhesive according to claim 1, wherein the amine-epoxy adduct has a weight average molecular weight (Mw) in the range of 800 g/mol to 1500 g/mol.
16. The adhesive according to claim 1, wherein the amine-epoxy adduct has a glass transition temperature ($T_g$) of 40° C. to 160° C.
17. The adhesive according to claim 1, wherein the adhesive comprises the one or more amine-epoxy adducts in an amount of 1 to 10 wt.-%, based on the total amount of the adhesive.
18. A cured product of the adhesive according to claim 1.
19. A bonded assembly comprising two substrates aligned in a spaced apart relationship, each of which having an inwardly facing surface and an outwardly facing surface, wherein between the inwardly facing surfaces of each of the two substrates an electrically conductive bond is formed by the cured product of claim 18.
20. An electronic device, integrated circuit, semiconductor device, passive component, solar cell, solar module, or light emitting diode, comprising the adhesive according to claim 1.

* * * * *

UNITED STATES PATENT AND TRADEMARK OFFICE
CERTIFICATE OF CORRECTION

| | |
|---|---|
| PATENT NO. | : 9,770,886 B2 |
| APPLICATION NO. | : 14/190762 |
| DATED | : September 26, 2017 |
| INVENTOR(S) | : Gunther Dreezen, Liesbeth Theunissen and Anja Henckens |

It is certified that error appears in the above-identified patent and that said Letters Patent is hereby corrected as shown below:

In the Specification

Column 7, Line 37: Change "trinnethyl" to -- trimethyl --.

Column 8, Line 29: Change "(3-hydroxynaphthoic acid" to -- β-hydroxynaphthoic acid --.

Signed and Sealed this
Twenty-eighth Day of August, 2018

Andrei Iancu
*Director of the United States Patent and Trademark Office*